Oct. 22, 1940.    L. D. RICHARDS    2,218,551
PROCESS FOR DRYING MAGNESIUM SULPHATE
Filed April 30, 1938
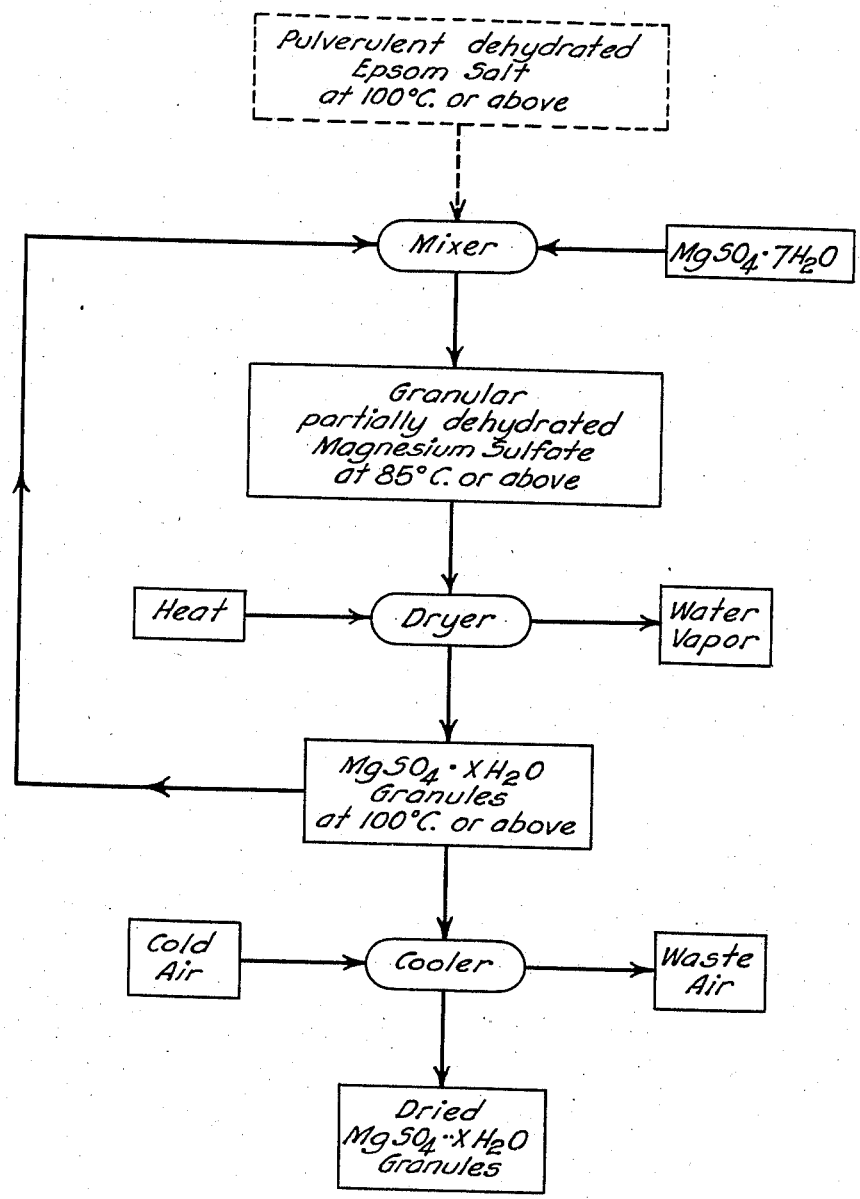
INVENTOR.
Leo D. Richards
BY Griswold & Burdick
ATTORNEYS.

Patented Oct. 22, 1940

2,218,551

UNITED STATES PATENT OFFICE 2,218,551

PROCESS FOR DRYING MAGNESIUM SULPHATE

Leo D. Richards, Midland, Mich., assignor to The Dow Chemical Company, Midland, Mich., a corporation of Michigan Application April 30, 1938, Serial No. 205,388

7 Claims. (Cl. 23—128)

The invention relates to the drying of hydrated magnesium sulphate, or Epsom salt, to produce a hard, dense, granular product.

The Epsom salt of commerce is a hydrated crystalline salt containing 7 molecules of water of crystallization, the formula being $MgSO_4.7H_2O$. For some uses in the arts, however, a partially dehydrated or anhydrous product is desired. However, drying magnesium sulphate heptahydrate by any of the well known methods of drying a hydrated salt generally produces a product unsatisfactory for commercial use. For example, when $MgSO_4.7H_2O$ crystals are heated rapidly to drive off the water of crystallization, they melt and form a fused mass which is then difficult to dehydrate and incapable of yielding a marketable product. On the other hand, if the heating is carried out slowly, as by air drying at a moderate temperature under vacuum to avoid melting the crystals, they become porous, soft and extremely light, so that they crumble and disintegrate into a fine powder or dust, both during the drying and the subsequent handling. Due to its finely divided form, a substantial loss of material occurs during drying. Such a product is difficult to handle and, being very light, must be packaged in bulky containers if it is to be shipped.

It is, therefore, among the objects of the invention to provide a method of dehydrating magnesium sulphate heptahydrate which is capable of yielding a product in the form of dense, hard, granular particles rather than a light powdery material.

I have found that the aforementioned difficulties and disadvantages can be overcome by mixing the normal hydrated salt ($MgSO_4.7H_2O$) crystals with a relatively hot mass of either granular or pulverulent partially or completely dehydrated Epsom salt under conditions such that the hydrated salt is melted and absorbed by or upon the particles of the partially or completely dehydrated material. The product obtained is in the form of relatively hard granular shot-like particles substantially free from lumps and dust. The hard dense partially dehydrated granules so obtained may be then further dehydrated to a lower water content, if so desired, without material loss of its hard structure.

The invention, then, consists of the process hereinafter fully described and particularly pointed out in the claims, the annexed drawing and the following description setting forth in detail a mode of carrying out the invention.

The following detailed description of my improved process may be readily followed by reference to the accompanying drawing, the single figure of which illustrates diagrammatically a sequence of steps for carrying out the process. As indicated in the drawing, the process is started by first preparing a quantity of dehydrated pulverulent Epsom salt containing about three or less molecules of water of crystallization. Such material is conveniently prepared by slowly drying $MgSO_4.7H_2O$ at a moderate temperature in a conventional type dryer. The initial drying temperature should be slightly above room temperature (e. g. 40 C.) and as the drying slowly proceeds the temperature is gradually raised, the final drying temperature depending on the degree of dehydration desired. A final temperature of from 100°–140° C. produces a $MgSO_4$ containing about three molecules of water crystallization, while a higher temperature of around 180°–200° C. gives $MgSO_4.H_2O$. A still higher temperature above 200° C. produces anhydrous magnesium sulphate. Any of these partially or completely dehydrated pulverulent magnesium sulphates so, or otherwise produced may be suitably used to start the process.

A quantity of dehydrated Epsom salt, such as produced as described above, is heated to a temperature between about 100° and 300° C. or more and to this hot mass is added Epsom salt crystals while the mass is continually stirred, the amount of Epsom salt added being about ⅕ to 1 part by weight of that of the dehydrated Epsom salt. Such mixing may be brought about in any conventional type mixer. The addition is made at such rate that the temperature of the mixture does not fall substantially below 85° C. or materially exceed 140° C., the preferred temperature range being 100°–120° C. It is necessary that the amount of the heptahydrate crystals added to the partially or completely dehydrated salt, as well as the amount of the latter and its temperature, be such that the temperature of the resulting mixture is not less than about 85° C. or more than about 140° C. If the temperature of the mixture is less than about 85° C., the heptahydrate crystals do not melt at first but form a mechanical mixture which when subsequently heated to a higher temperature to bring about dehydration, produces a product which is in the form of a fine powder or dust. On the other hand, if the temperature of the mixture materially exceeds 140° C., the particles of dehydrated material are at a temperature so far above the temperature at which melted $MgSO_4.7H_2O$ boils that the melted $MgSO_4.7H_2O$ does not melt upon and penetrate the particles of dehydrated material, but instead the melted $MgSO_4.7H_2O$ is explosively expelled in fine particles from the surface of the dehydrated material due to the high temperature, so that further heating of this mixture produces a large amount of powdery material instead of hard shot-like particles. However, I have found that, when the temperature of the partially dehydrated Epsom salt and the amount used relative to that of the Epsom salt to be dried is properly regulated as stated above, such difficulty is entirely avoided. By heating the partially dehydrated Epsom salt to the preferred temperature (100° C. to 120° C.) and then adding the right proportion of the Epsom salt to be dried, the heptahydrate crystals melt quickly, and the molten hydrated salt, on being thoroughly intermixed with the hot partially or completely dehydrated salt particles, forms a film of molten salt upon the particles of dehydrated material which becomes absorbed by the latter. Thereby a mass of non-coherent granules resembling shot in shape is formed in which the individual shot-like particles at the prevailing temperature do not coalesce to form larger aggregates.

It is important as already indicated to employ the proper proportions of heptahydrate crystals relative to the partially or completely dehydrated Epsom salt. In general, one part by weight of heptahydrate to four parts by weight of the dehydrated material is most satisfactory, although the proportion may be varied from about one to five parts of the dehydrated material to one part of heptahydrate, depending on the temperature of the dehydrated material before mixing and the degree of dehydration of this material. For example, satisfactory results were obtained by mixing magnesium sulphate heptahydrate with partially dehydrated Epsom salt (87 per cent $MgSO_4$) in a ratio of 400 lbs. per hr. of the heptahydrate to 1500 lbs. per hr. of the hot dehydrated Epsom salt, the temperature of the latter being 275° C. which was sufficient to keep the temperature of the mixture at 85° C. Other ratios may be employed by properly controlling the temperature of dehydrated material so as to produce a mixture having a temperature between about 85° to 140° C.

After the granular mixture is prepared as described, it may then be subjected to a heating or drying operation to bring about further dehydration, if desired, without loss of the hard shot-like particle form. The heating operation may be carried out in a conventional dryer, such as a shelf dryer provided with means to stir the mixture during the drying. The mixture is heated to such a temperature as will bring about the desired state of dehydration and is continually stirred during the heating operation. To produce the usually desired $MgSO_4.1H_2O$ (85–87 per cent $MgSO_4$), the mixture is heated to 180°–200° C. in the dryer, while anhydrous $MgSO_4$ may be made by subjecting the heptahydrate-dehydrate mixture to a temperature of above 200° C. A partially dehydrated, hard, granular Epsom salt, having a water content corresponding to from 2½ to 3 molecules of water of crystallization (e. g. 68–75 per cent $MgSO_4$) can be produced in the mixer of the first stage, and if a product having this water content is desired, further drying is unnecessary if the mixing operation is carried out at the proper temperature and with the right proportion of ingredients.

The dehydrated product obtained from the dryer which consists of hard, dense granules of completely or partially dehydrated Epsom salt may then be divided into two portions, one of which, while still hot, is returned to the first step of the process as shown in the figure and mixed with the proper proportion of heptahydrate crystals as previously described. Thereafter, the process may be carried out using a portion of the hard dense granular product as the starting material instead of using or specially preparing pulverulent material as was necessary to start the process. The other portion of the hot dehydrated product may be passed through a cooler to cool it to a suitable packaging temperature, after which it may be packaged or otherwise made ready for shipment or use.

I am aware that it has been proposed to dehydrate various other hydrated salts by procedures employing the intermixing of the hydrated salt with the dehydrated salt and then further drying the mixture. However, applying these methods to the drying of Epsom salt does not produce dehydrated Epsom salt having the desired dense granular structure, such as is produced by the present improved process. In the methods previously proposed for drying hydrated salts, such as, for example, $Na_2SO_4.10H_2O$, the hydrated salt is mixed with the dehydrated salt while the latter is cold and then the mixture is heated to bring about dehydration. Such procedure, however, when applied to the drying of $MgSO_4.7H_2O$ produces a fine powder, the density of which is only one half of that of the dense shot-like particles produced by the present method.

Various modifications of the described process may be employed within the scope of the invention. For example, the dehydration of the heptahydrate may be carried out either as a continuous process, as illustrated, or as a batch process, wherein a quantity of heptahydrate is mixed with hot dehydrated magnesium sulphate and the mixture then dried at a suitable temperature to produce a product of the desired water content. The process may also be carried out by charging the heptahydrate into a rotary dryer of the usual type containing dehydrated magnesium sulphate at the proper temperature. In such a process, the heptahydrate may be charged continuously into the rotary dryer if a sufficient quantity of dehydrated Epsom salt is maintained in the dryer at a temperature such that after mixing the temperature of the mixture does not fall substantially below 85° C. or materially exceed 140° C.

The mechanical procedure for carrying out the process can naturally be varied in other ways, as will be apparent to those skilled in the art.

Other modes of applying the principle of my invention may be employed instead of those explained, change being made as regards the method herein disclosed, provided the step or steps stated by any of the following claims or the equivalent of such stated step or steps be employed.

I therefore particularly point out and distinctly claim as my invention:

1. In a method of drying magnesium sulphate-heptahydrate to form a hard dense granular product, the step which consists in thoroughly intermixing said heptahydrate with a quantity of hot dehydrated Epsom salt in an amount such that the temperature of the resulting mixture is between about 85°–140° C.

2. In a method of drying magnesium sulphate-heptahydrate to form a dense granular dehydrated product, the steps which consist in thoroughly intermixing said heptahydrate with a quantity of hot dehydrated Epsom salt, the temperature and the quantity of said dehydrated Epsom salt being so controlled that the temperature of the resulting mixture is between about 85° and 140° C., and subjecting the mixture so formed to a drying operation.

3. In a method of drying magnesium sulphate-heptahydrate to form a dense granular dehydrated product, the steps which consist in thoroughly intermixing one part by weight of said heptahydrate with from 1 to 5 parts by weight of hot dehydrated Epsom salt, the temperature of said dehydrated Epsom salt being such that the temperature of the resulting mixture is between about 85° and 140° C. and subjecting the mixture so formed to a drying operation.

4. In a method of drying magnesium sulphate-heptahydrate to form a dense granular dehydrated product, the steps which consist in thoroughly intermixing one part by weight of said heptahydrate with from 1 to 5 parts by weight of relatively hot dehydrated Epsom salt, the temperature of said dehydrated Epsom salt being such that the temperature of the resulting mixture is between about 85° and 140° C. and subjecting the mixture so formed to a drying operation at a temperature between about 100°–140° C. to form a dried product having a water content corresponding to substantially 2½ to 3 molecules of water of crystallization.

5. In a method of drying magnesium sulphate-heptahydrate to form a dense granular dehydrated product, the steps which consist in thoroughly intermixing one part by weight of said heptahydrate with from 1 to 5 parts by weight of hot dehydrated Epsom salt, the temperature of dehydrated Epsom salt being such that the temperature of the resulting mixture is between about 85° and 140° C. and subjecting the mixture so formed to a drying operation, at a temperature between about 180°–200° C. to form a dried product having a water content corresponding to substantially 1 molecule of water of crystallization.

6. In a method of drying magnesium sulphate-heptahydrate to form a dense granular dehydrated product, the steps which consist in thoroughly intermixing one part by weight of said heptahydrate with from 1 to 5 parts by weight of relatively hot dehydrated Epsom salt, the temperature of said dehydrated Epsom salt being such that the temperature of the resulting mixture is between about 85° and 140° C. and subjecting the mixture so formed to a drying operation at a temperature above 200° C. to form a dried product of substantially anhydrous magnesium sulphate.

7. In a method of drying magnesium sulphate-heptahydrate to form a dense granular dehydrated product, the steps which consist in continuously introducing into a mixer magnesium sulphate-heptahydrate, continuously introducing into said mixer hot dehydrated Epsom salt, the temperature of said dehydrated Epsom salt being such that the temperature of the resulting mixture is between about 85° and 140° C., continuously withdrawing some of the resulting mixture from the mixer, and subjecting the withdrawn mixture to a drying operation.

LEO D. RICHARDS.